(12) United States Patent
Kamijoh et al.

(10) Patent No.: US 7,526,099 B2
(45) Date of Patent: Apr. 28, 2009

(54) MOTION PICTURE DATA PROCESSING DEVICE, METHOD, AND PROGRAM

(75) Inventors: Kohichi Kamijoh, Yokohama (JP); Seiji Nagata, Yokohama (JP); Masaaki Taniguchi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 958 days.

(21) Appl. No.: 10/809,673

(22) Filed: Mar. 25, 2004

(65) Prior Publication Data

US 2004/0223612 A1 Nov. 11, 2004

(30) Foreign Application Priority Data

May 9, 2003 (JP) ............................. 2003-131500

(51) Int. Cl.
*G06K 9/00* (2006.01)
(52) U.S. Cl. ..................................... 382/100
(58) Field of Classification Search ................. 382/100
See application file for complete search history.

(56) References Cited

U.S. PATENT DOCUMENTS 5,809,139 A * 9/1998 Girod et al. ................. 380/202
6,310,962 B1 * 10/2001 Chung et al. ................ 382/100
6,341,350 B1 * 1/2002 Miyahara et al. ............ 713/176

OTHER PUBLICATIONS

Frank Hartung, et al., "Watermarking of Uncompressed and Compressed Video", Signal Processing vol. 66, p. 283-301, published May 28, 1998.
PEPA 3269015, Apr. 30, 1999, Kobayashi Seishi, et al.

* cited by examiner

*Primary Examiner*—Tom Y Lu
(74) *Attorney, Agent, or Firm*—Yee & Associates, P.C.; Herman Rodriguez

(57) ABSTRACT

To provide lossless embedding of a visible watermark in compressed motion picture data.

The present invention includes a quantization/dequantization operation part 10 for dequantizing motion picture data that has been subjected to compression including frequency transformation and quantization, and a watermark embedding/removing operation part 30 for generating and embedding a pattern of a visible watermark corresponding to a motion compensated prediction in motion picture data dequantized by the quantization/dequantization operation part 10. The quantization/dequantization operation part 10 quantizes motion picture data with a watermark embedded by the watermark embedding/removing operation part 30.

8 Claims, 15 Drawing Sheets

[Figure 1]
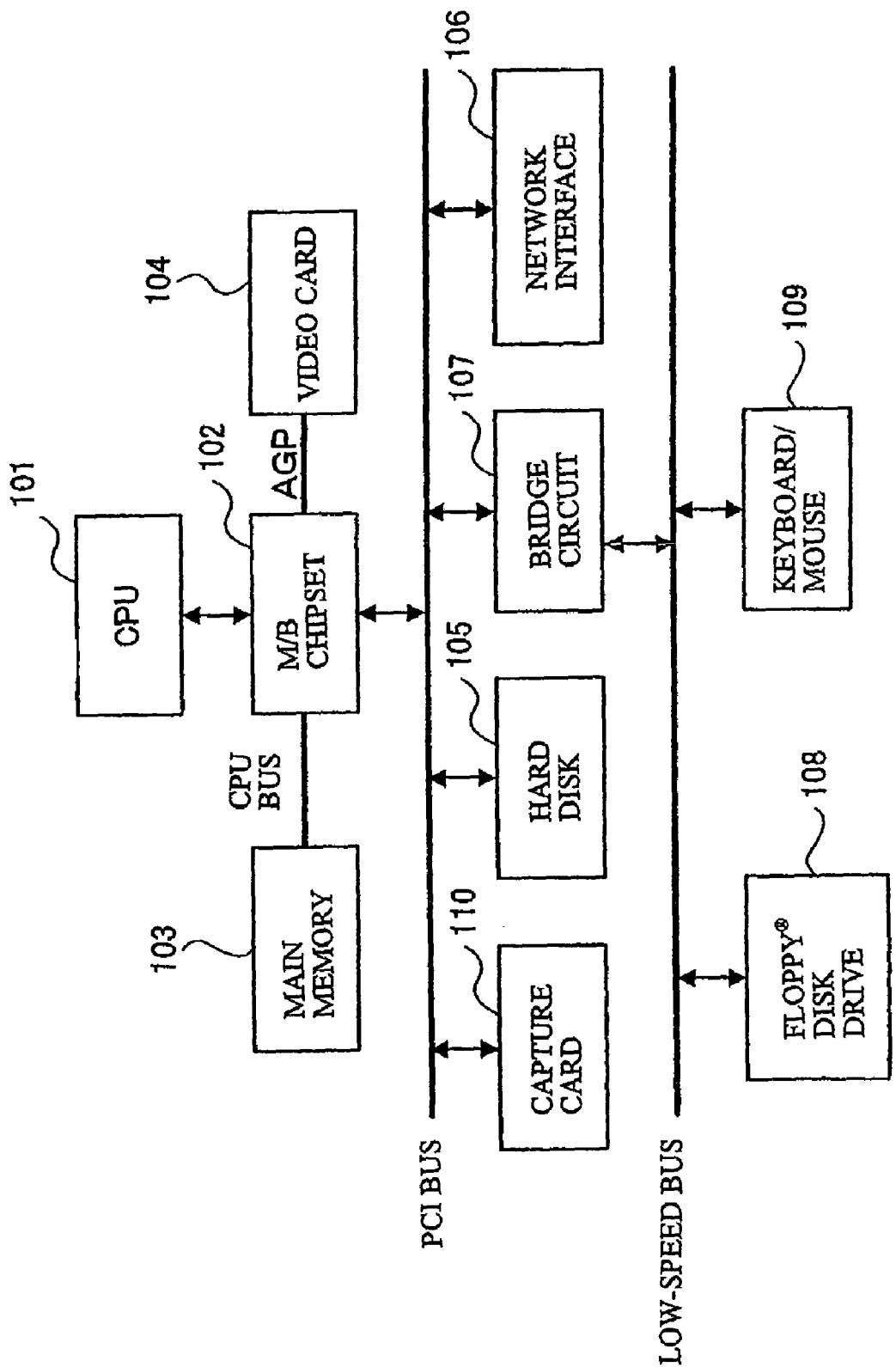

[Figure 2]
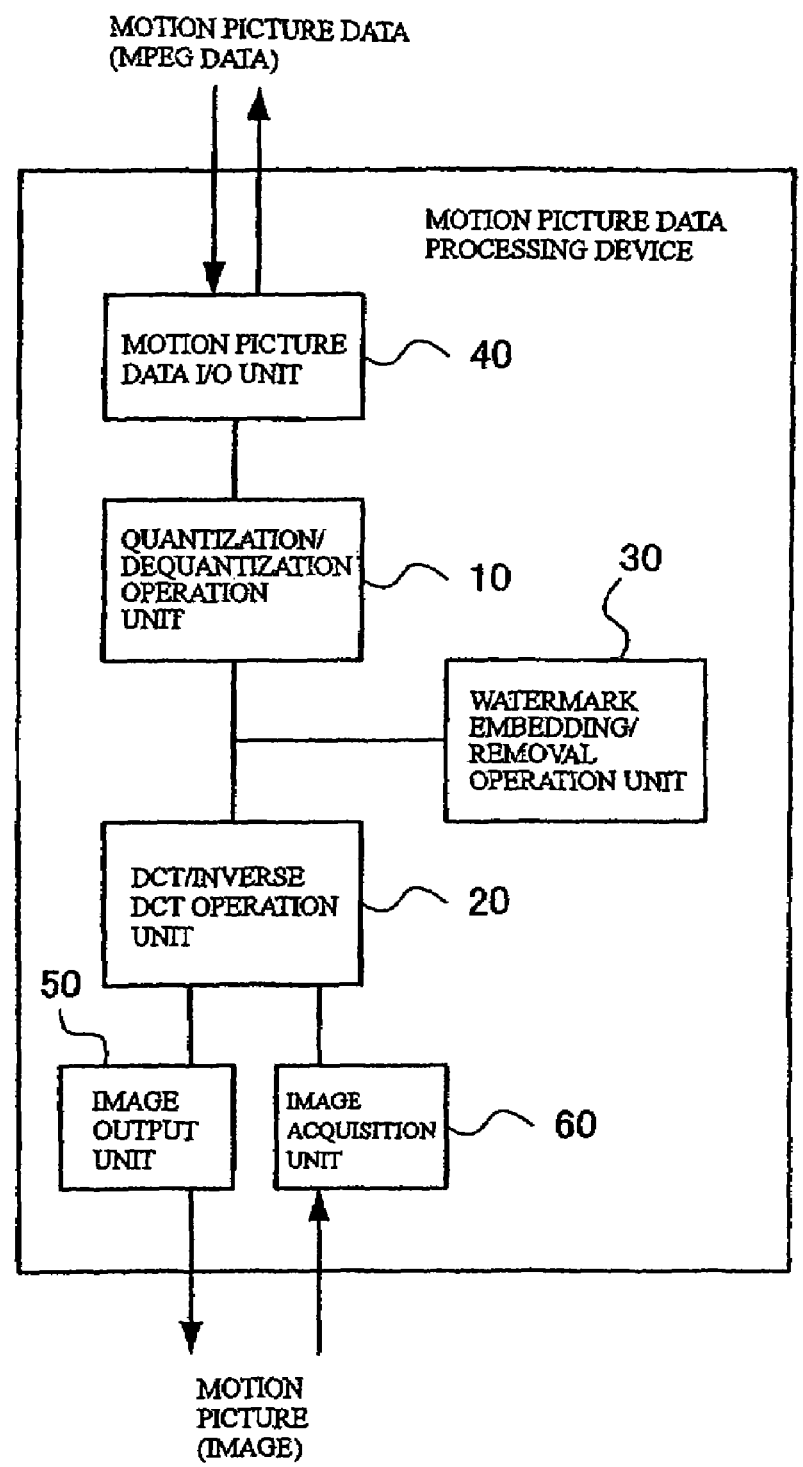

[Figure 3]
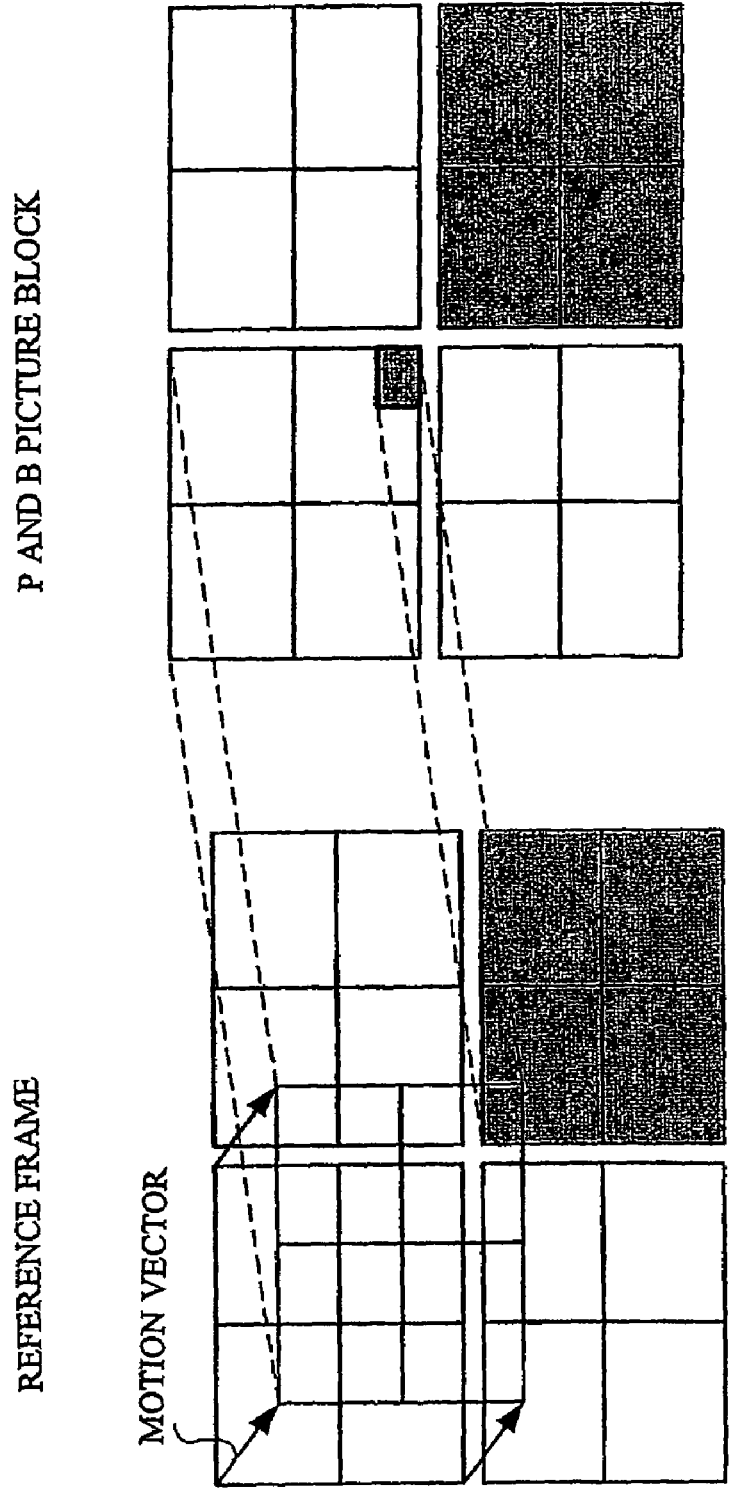

[Figure 4]
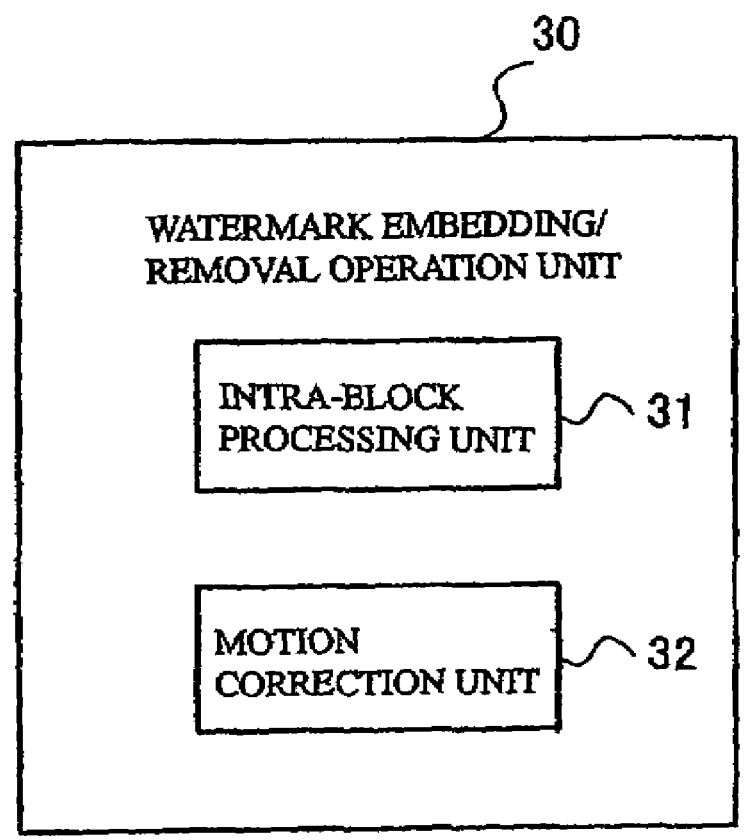

[Figure 5]
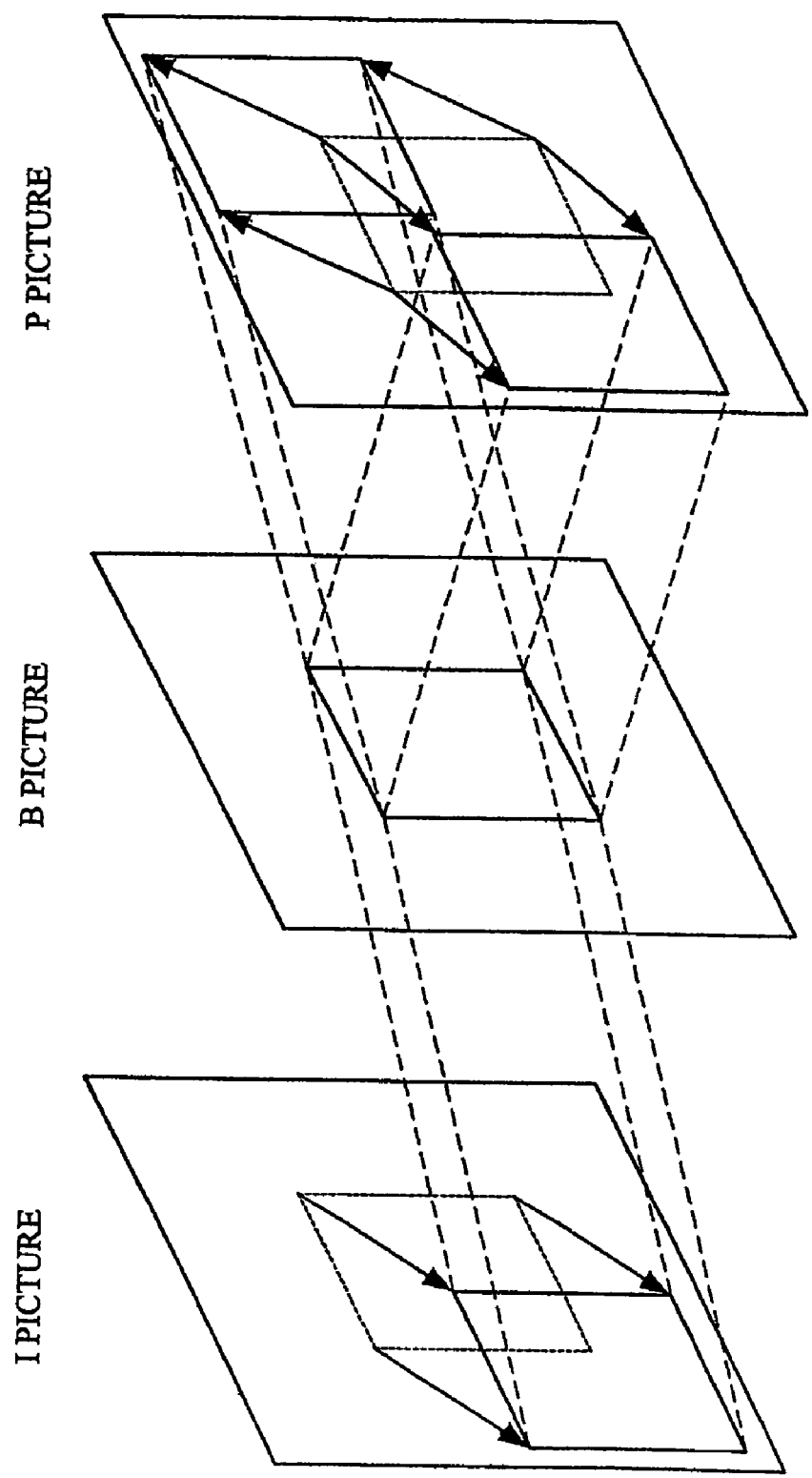

[Figure 6]
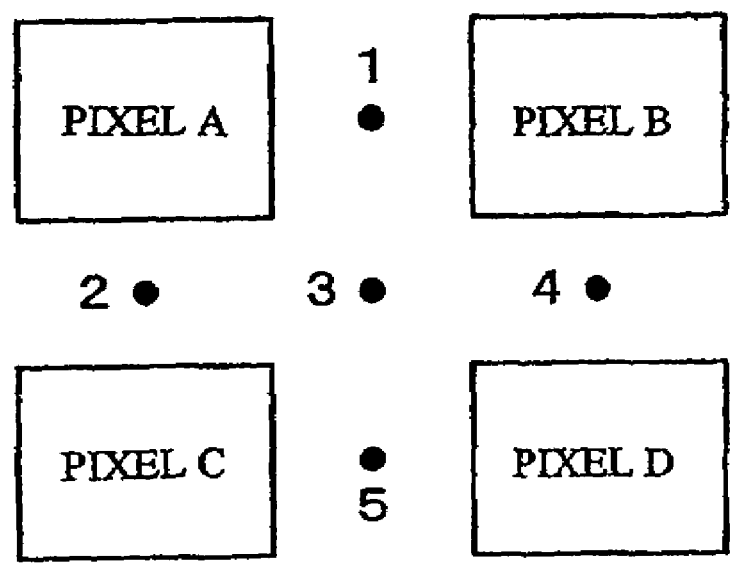

[Figure 7]
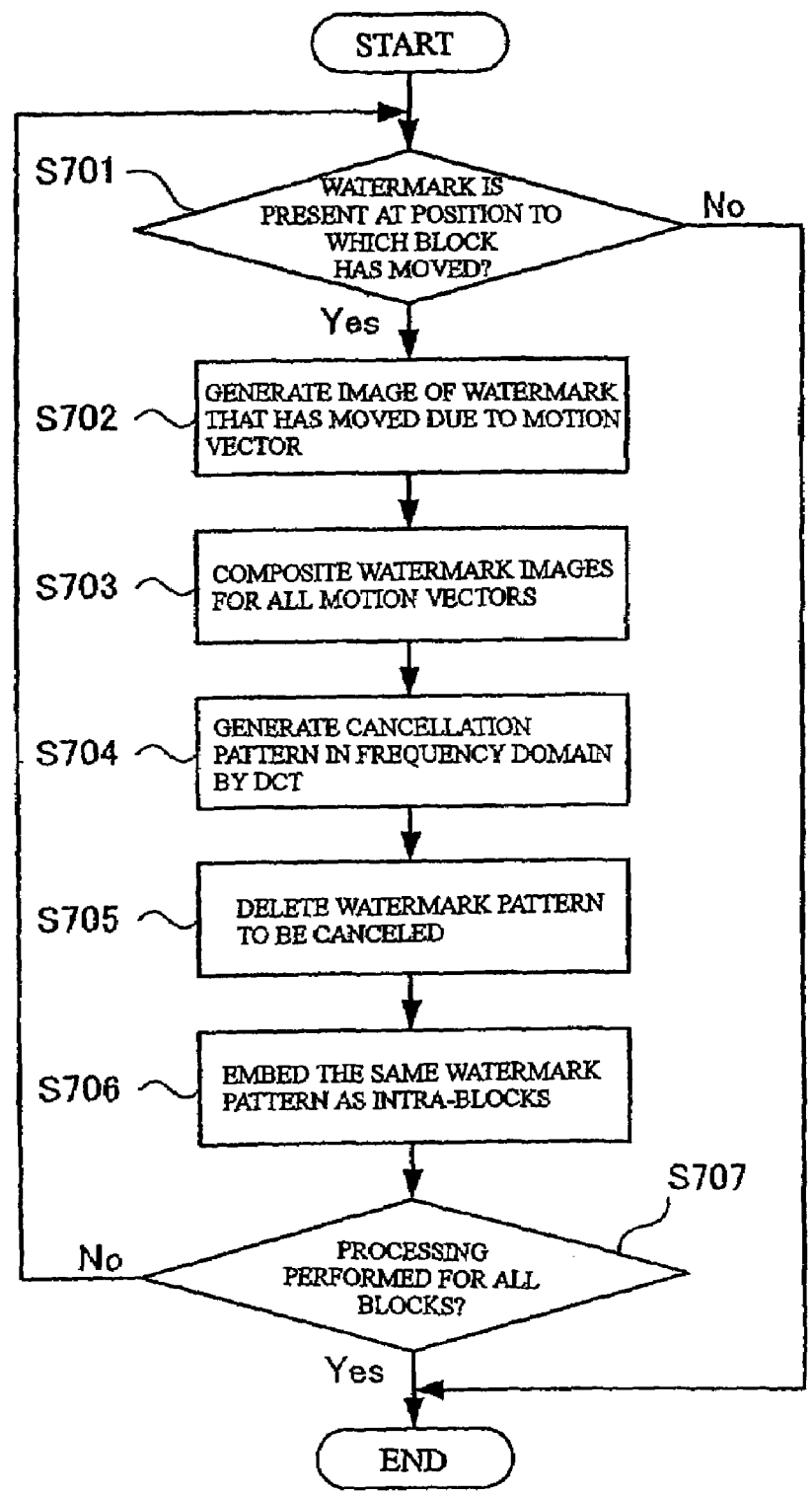

[Figure 8]
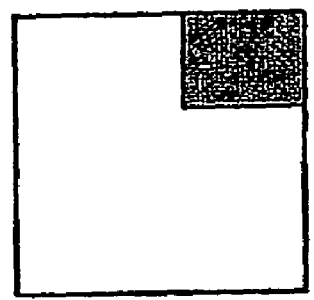
BASIC PATTERN 4
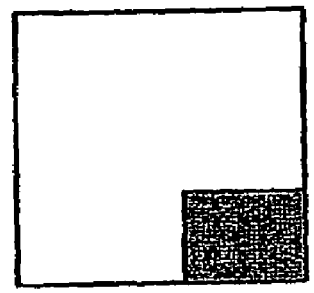
BASIC PATTERN 3
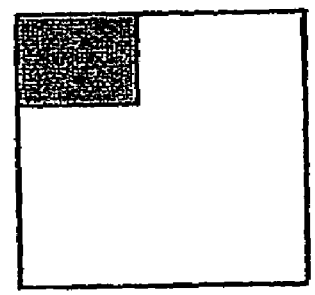
BASIC PATTERN 2
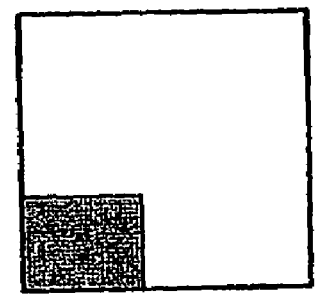
BASIC PATTERN 1

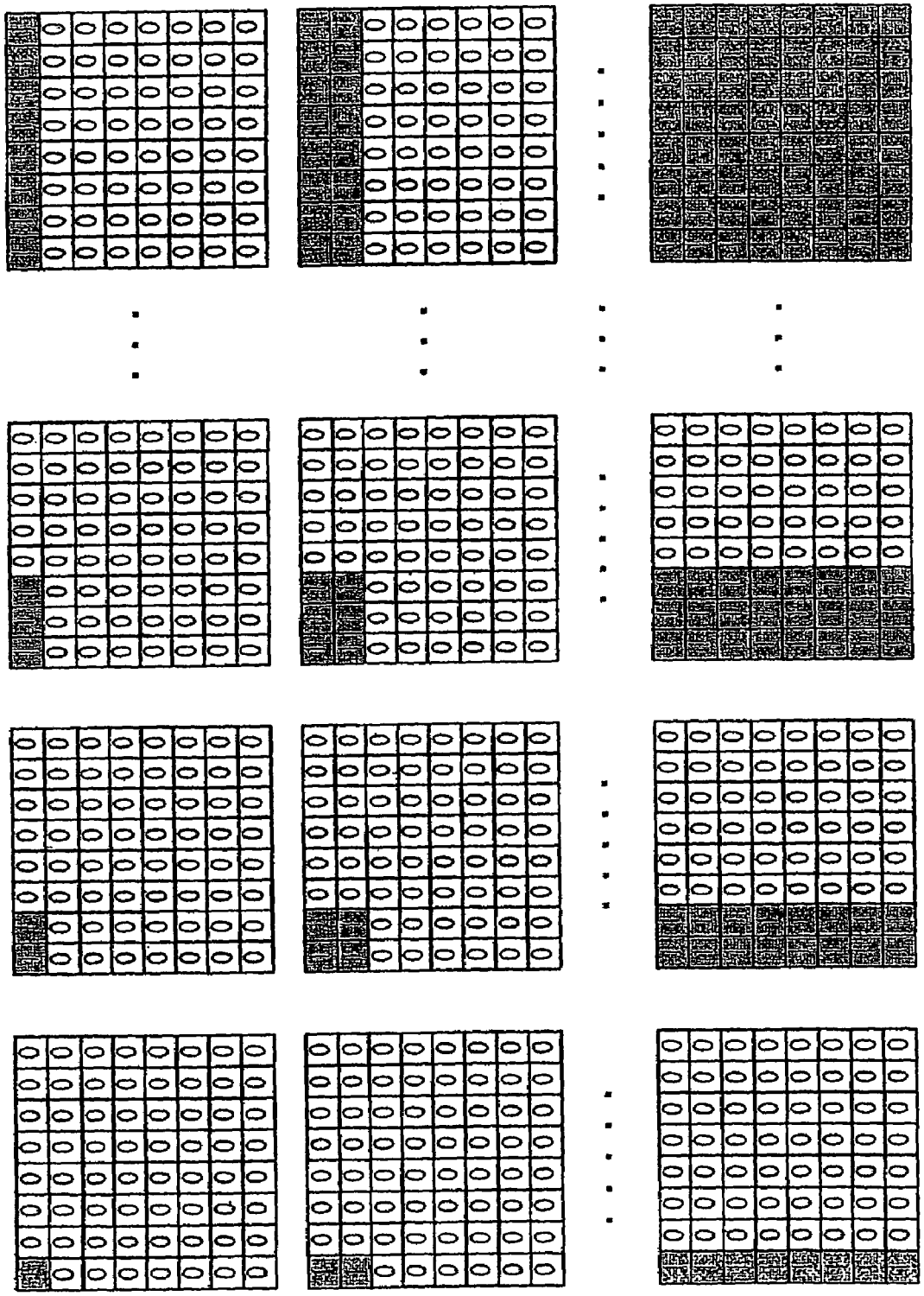
[Figure 9]

[Figure 10]
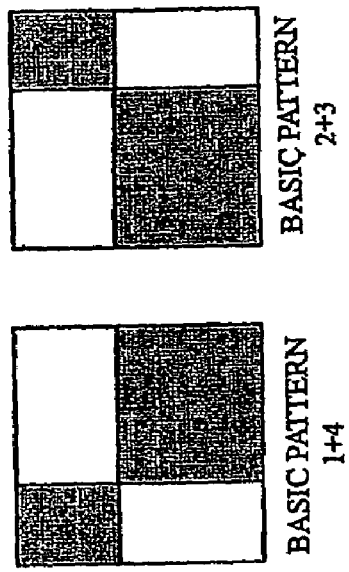
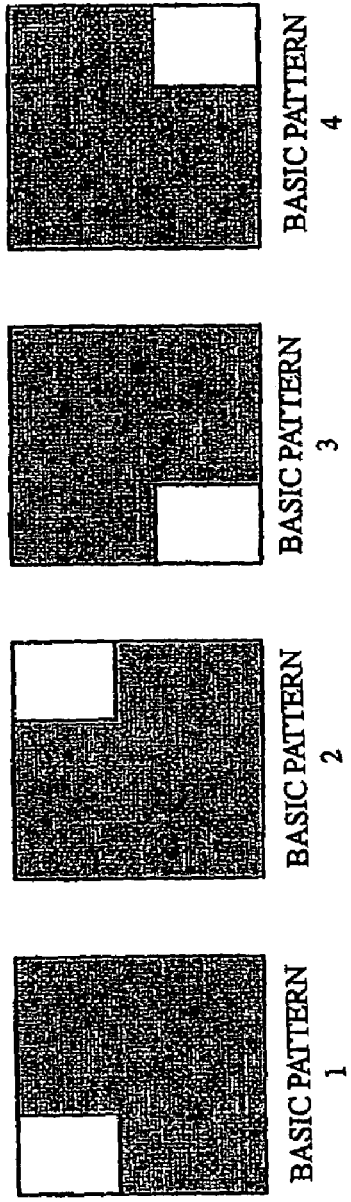

[Figure 11]
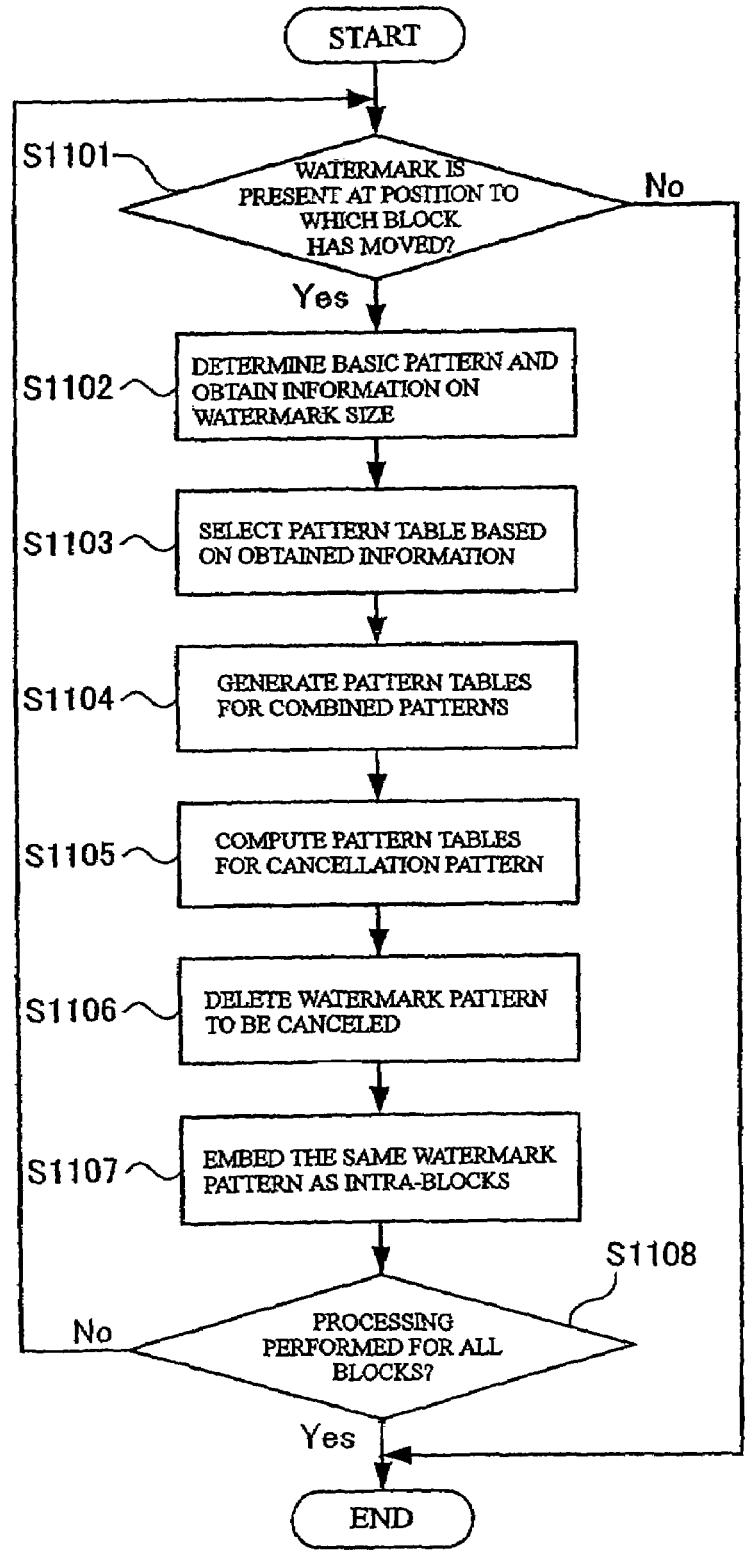

[Figure 12]
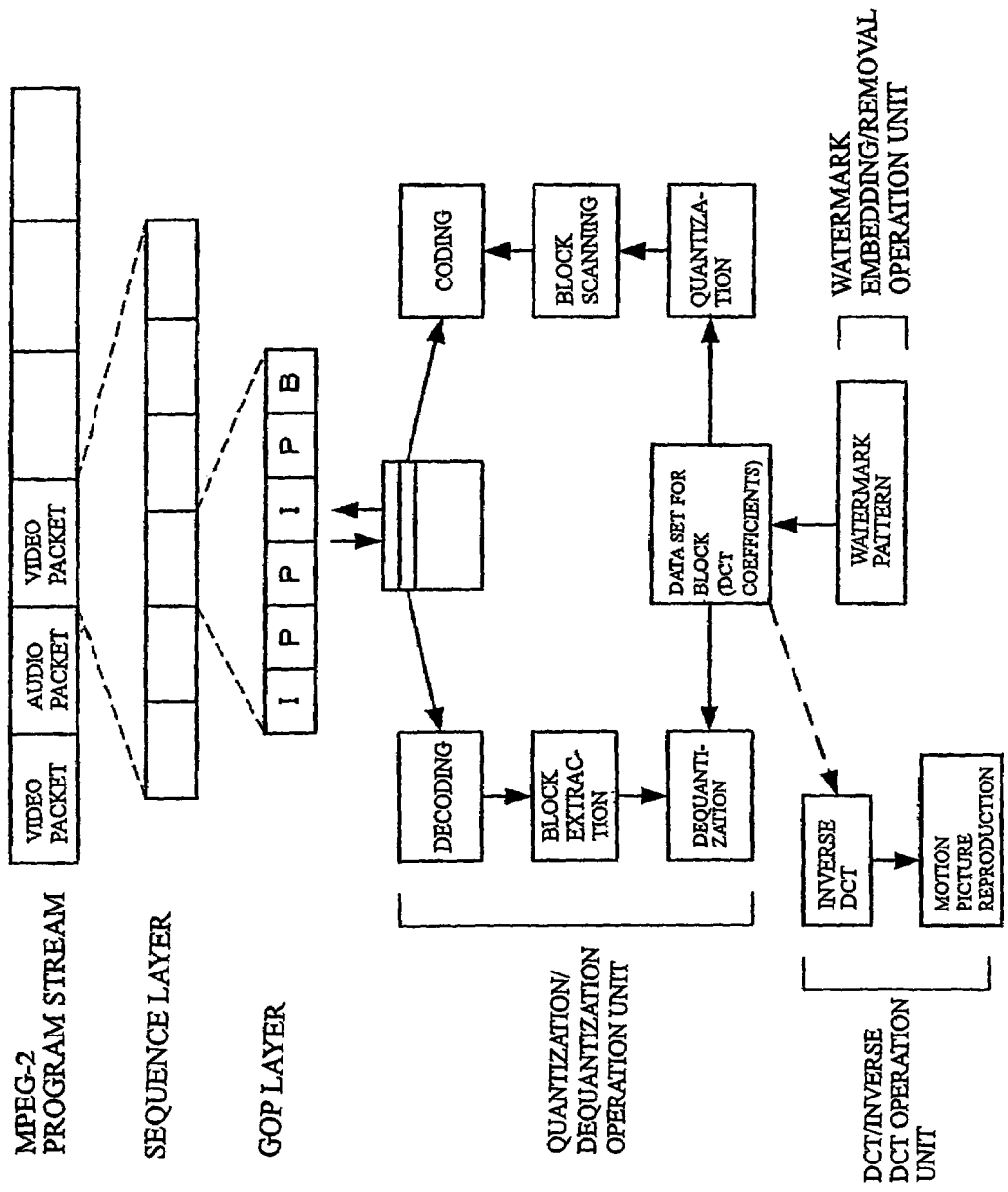

[Figure 13]
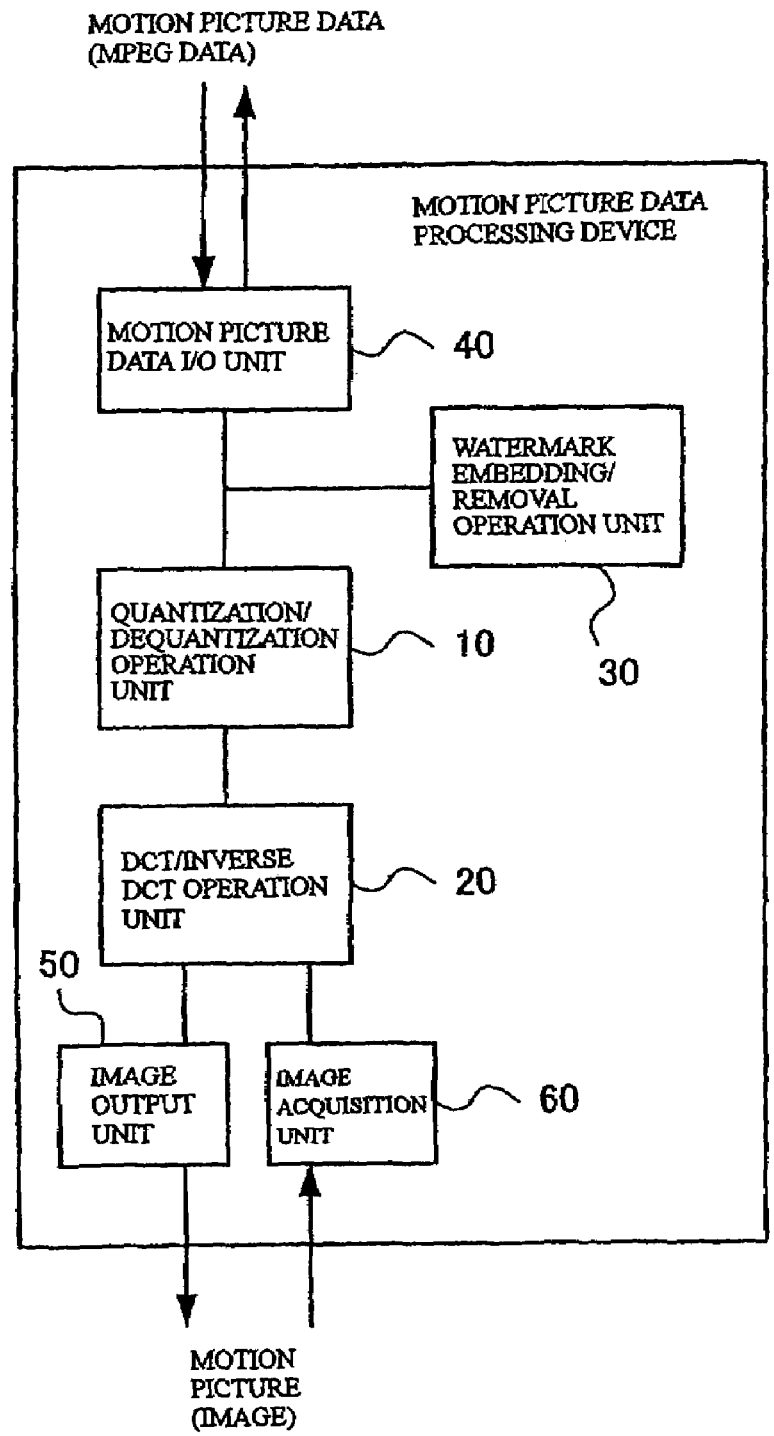

[Figure 14]
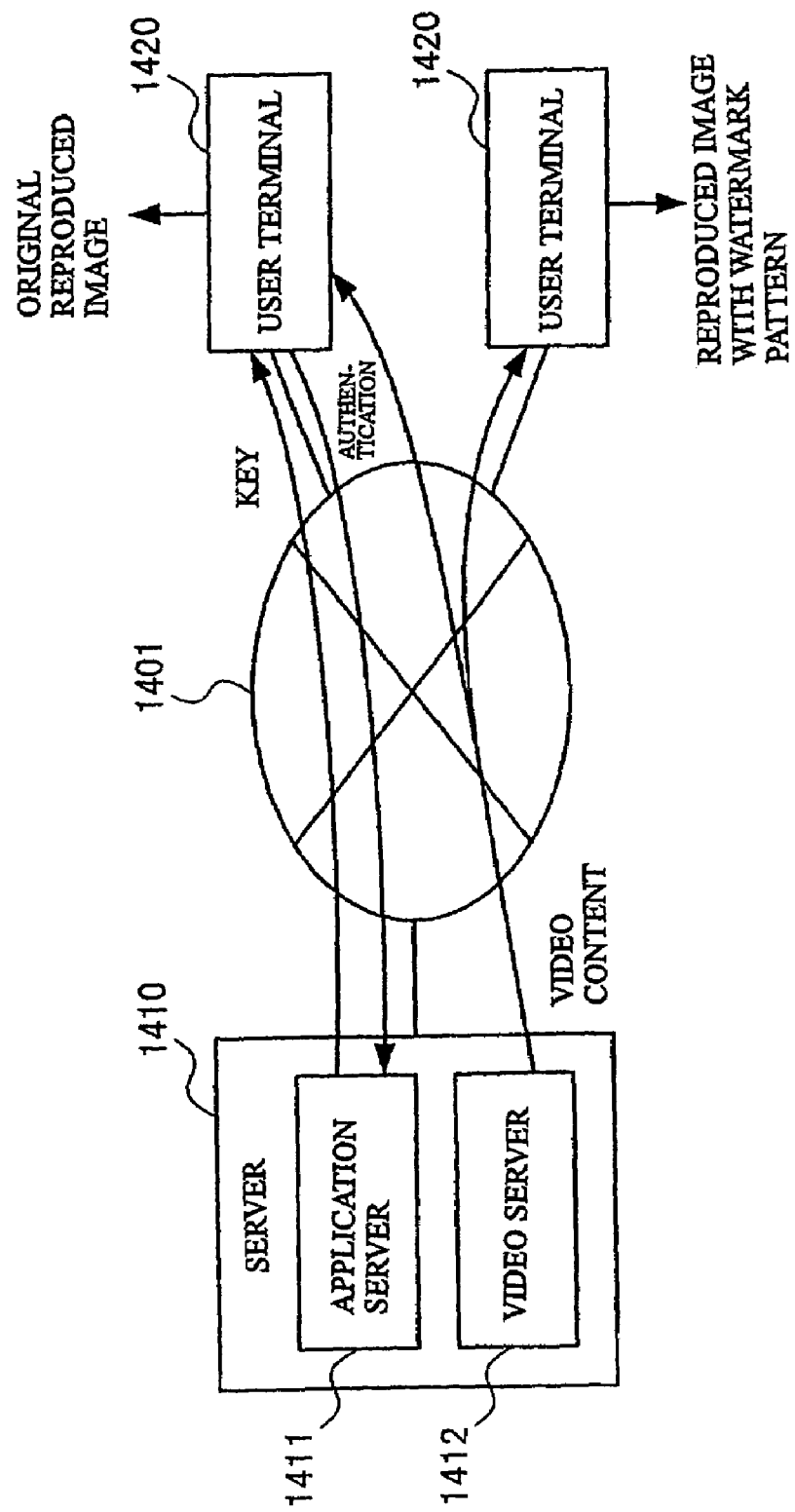

[Figure 15]
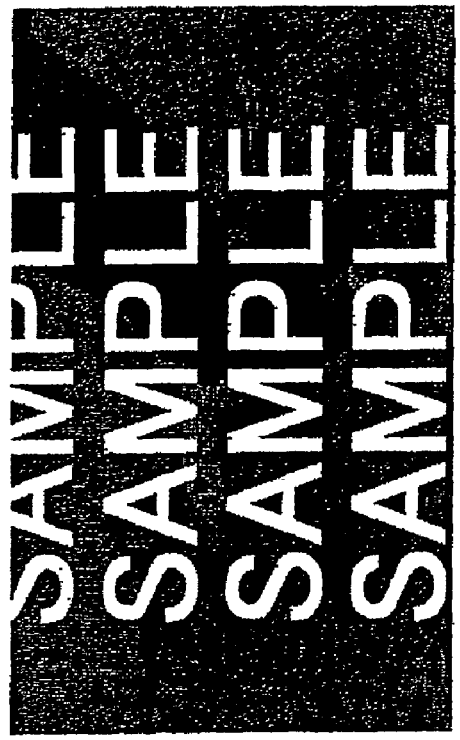
IMAGE WITH WATERMARK PATTERN
CONTENT IMAGE

MOTION PICTURE DATA PROCESSING DEVICE, METHOD, AND PROGRAM

FIELD OF THE INVENTION

The present invention relates to security of motion picture data, and more particularly to visible watermarks for embedding and removing an image that is distinct from an original content over an original image.

BACKGROUND ART

In handling digital data, various security measures such as data encryption are utilized for preventing unauthorized accesses. Security measures for image data include techniques to embed a visible watermark in image data for displaying an image irrelevant to original contents over a reproduced image so as to prevent a user without valid authority from reproducing and utilizing the contents.

Visible watermarking is implemented by applying techniques for embedding a digital watermark in an image. Specifically, using a technique for embedding invisible watermark information (such as fingerprinting) in an image for the purpose of copyright protection, tracking of unauthorized use, and detection of tampered data, a visible watermark pattern is embedded instead of invisible watermark information or in addition to invisible watermark information (see Patent Document 1, for example). This operation causes the visible watermark pattern to appear over the original motion picture when the video contents into which the visible watermark has been embedded is replayed, thus obstructing one's view. Therefore, by giving information for eliminating the visible watermark to authorized users, such a system can be constructed that allows only users having valid authority can replay and see the original motion picture.

In the case image data is encrypted, an image cannot be reproduced at all if the cipher cannot be decrypted, whereas masking of an image with a visible watermark can implement various aspects depending on purposes such as covering an entire screen to prevent one to recognize a reproduced image at all and covering a portion of the screen to allow one to guess what is shown on the screen, providing greater utility.

FIG. 15 shows examples of a screen that shows a content image and one that shows the same image together with an image showing a visible watermark covering some portions of the image.

There has been a completely lossless method for embedding and removing a visible watermark in/from image data for still picture data in JPEG format and the like (see Patent Document 1, for example). However, for motion picture data that is produced by digitalizing video contents, no effective technique for embedding visible watermarks had been proposed.

Motion picture data such as video is typically handled (preserved, processed, or transferred) with the information compressed because such data involves a vast amount of data. In MPEG format, which is used for DVD video and the like, compression for motion picture data is performed through encoding using DCT (Discrete Cosine Transform) and motion-compensated inter-frame predictive coding (see Non-Patent Document 1, for example).

[Patent Document 1]
   Japanese Patent No. 3269015

[Non-Patent Document 1]
   "Illustrated Tutorial of the latest MPEG" editorial supervision by Hiroshi Fujiwara, Multimedia Communication Workshop ed. ASCII, Jul. 26, 1994

Problems to be Solved by the Invention

Because motion picture data is typically compressed as mentioned above, such methods as follows are possible that embed a visible watermark in entire motion picture data by embedding a visible watermark in uncompressed motion picture data.
1. After embedding a visible watermark in pixel values of motion picture data, the data is compressed. The visible watermark is removed after the motion picture is decompressed to pixel value.
2. Compressed motion picture data is temporally decompressed to pixel values, a visible watermark is embedded, and then the data is compressed again. Removal of the visible watermark is done in a similar way: the compressed motion picture data is temporally decompressed to pixel values, the watermark is removed, and then the data is compressed again.

The technique 1 described above has a problem that data of a significant size prior to compression should be handled to embed or remove a visible watermark in/from motion picture data, thereby heavily burdening hardware during processing.

For the technique 2, compression is performed using DCT (Discrete Cosine Transform) in MPEG, for example, and DCT and quantization are lossy processing. Thus, the technique poses a problem that an image deteriorates each time compressed motion picture data is decompressed to pixel values for embedding or removing a visible watermark.

In view of those problems, it is an object of the invention to provide means for embedding and removing a visible watermark in/from compressed motion picture data.

Another object of the invention is to realize complete reversibility in embedding and removing a visible watermark in/from compressed motion picture data.

SUMMARY OF THE INVENTION

The invention for attaining those objects is implemented as a motion picture data processing device having a configuration as follows. That is, the motion picture data processing device comprises dequantization means for dequantizing motion picture data that has been subjected to compression including frequency transformation and quantization, watermark embedding means for generating and embedding a pattern of a visible digital watermark corresponding to motion compensated prediction in the motion picture data that has been dequantized by the dequantization means, and quantization means for quantizing the motion picture data with a digital watermark embedded by the watermark embedding means.

More particularly, the watermark embedding means comprises intra-block processing means for embedding a digital watermark pattern into screens that have pixel values relevant to all pixels as information among screens constituting the motion picture data, and motion correction means for embedding a cancellation pattern for canceling the movement of the digital watermark pattern due to motion vectors into a screen that is generated through motion compensated prediction based on motion vectors among screens constituting the motion picture data.

More specifically, the motion correction means generates an image of a cancellation pattern, subjects it to frequency transformation, and embeds it in a screen being processed. Alternatively, the motion correction means prepares pattern tables for possible cancellation patterns that have been subjected to frequency transformation, and selects and embeds an appropriate pattern table in a screen being processed.

Another motion picture data processing device of the invention comprises dequantization means for dequantizing motion picture data that has been subjected to compression including DCT (Discrete Cosine Transform) and quantization, watermark embedding means for embedding a digital watermark pattern that has been converted to DCT coefficients into the motion picture data that has been dequantized by the dequantization means, and quantization means for quantizing the motion picture data in which a digital watermark has been embedded by the watermark embedding means.

The invention for attaining the objects above is also implemented as a motion picture data processing method for embedding a digital watermark into motion picture data that has been subjected to compression including frequency transformation and quantization using a computer. That is, the motion picture data processing method comprises a first step of dequantizing motion picture data that has been subjected to compression and storing the data in predetermined storage means, a second step of embedding a pattern of a visible digital watermark pattern corresponding to motion compensated prediction into the dequantized motion picture data and storing the data in predetermined storage means, and a third step of quantizing the motion picture data in which the digital watermark has been embedded.

Another motion picture data processing method of the invention is a method for removing a digital watermark from motion picture data using a computer, comprising the steps of dequantizing motion picture data that has been subjected to compression and storing the data in predetermined storage means, removing a pattern of a risible digital watermark corresponding to motion compensated prediction that is embedded in the dequantized motion picture data and storing the data in predetermined storage means, and quantizing the motion picture data with the digital watermark removed.

The invention is further implemented as a program for controlling a computer to cause it to function as the motion picture data processing device described above, or alternatively, as a program for causing a computer to execute processing corresponding to the steps of the motion data processing methods above. The program can be distributed as stored on a magnetic disk, optical disk, semiconductor memory, or other types of recording medium, or distributed over a network.

PREFERRED EMBODIMENT

The invention will be described in detail based on its embodiments shown in the accompanying drawings.

While the following describes the invention with MPEG-2 as an example of data format of motion picture data, it is understood that the invention can be applied to motion picture data in various formats that perform compression using DCT coding and motion-compensated inter-frame predictive coding.

FIG. 1 schematically shows an example of the hardware configuration of a computer that can embed and remove a digital watermark (visible watermark, hereinafter referred to just as "watermark") according to an embodiment of the invention.

The computer shown in FIG. 1 comprises a CPU (Central Processing Unit) 101 as operation means, main memory 103 that is connected to the CPU 101 through M/B (motherboard) chipset 102 and a CPU bus, a video card 104 that is also connected to the CPU 101 through the M/B chipset 102 and an AGP (Accelerated Graphics Port), hard disk 105 that is connected to the M/B chipset 102 through a PCI (Peripheral Component Interconnect) bus, network interface 106, capture card 110 for inputting images, and floppy disk 108 and keyboard/mouse 109 that are connected to the M/B chipset 102 via a bridge circuit 107 and a low-speed bus such as ISA (Industry Standard Architecture) bus through the PCI bus.

FIG. 1 only illustrates a hardware configuration of the computer for implementing the embodiment, and various other configurations are possible as long as the embodiment is applicable to them. For example, instead of the video card 104, only video memory may be provided and the CPU 101 processes image data, or a CD-R (Compact Disc Recordable) drive or a DVD-RAM (Digital Versatile Disc Random Access Memory) drive may be provided via an interface such as ATA (AT Attachment) or SCSI (Small Computer System Interface) as an external storage device.

FIG. 2 shows the functional configuration of a motion picture data processing device for implementing embedding and removing of watermarks according to the embodiment.

As shown, the motion picture data processing device of the embodiment comprises a quantization/dequantization operation unit 10 and a DCT/inverse DCT operation unit 20 for reproducing motion picture (image) from motion picture data in MPEG-2 format (hereinafter referred to as "MPEG data") and generating MPEG data from motion picture (image), a watermark embedding/removal operation unit 30 for performing embedding and removal of watermarks in/from motion picture data, a motion picture data input/output unit 40 for inputting/outputting MPEG data, an image output unit 50 for displaying on a display device motion picture reproduced by the quantization/dequantization operation unit 10 and DCT/inverse DCT operation unit 20, and an image acquisition unit 60 for inputting motion picture (image).

Among the components, the quantization/dequantization operation unit 10, DCT/inverse DCT operation unit 20, and watermark embedding/removal operation unit 30 are virtual software blocks that are implemented by the CPU 101 in FIG. 1 controlled by a program. The program controlling the CPU 101 can be provided as stored on a magnetic disk, optical disk, semiconductor memory, or other recording media, or can be distributed over a network.

The motion picture data input/output unit 40 is implemented by a hard disk controller provided as a function of the CPU 101 controlled by a program when motion picture data is stored on the hard disk 105 shown in FIG. 1 and the like, and by the network interface 106 when motion picture data is input/output in streaming format with an external device.

The image output unit 50 can be implemented by the video card 104 shown in FIG. 1, and the image acquisition unit 60 can be implemented by the capture card 110 in FIG. 1, for example.

MPEG-2 categorizes a screen into three types: I (intra coded) picture, P (predictive coded) picture, and B (bi-directionally predictive coded) picture. And image data is compressed using DCT coding and motion-compensated inter-frame predictive coding as indicated above. In MPEG-2 for interlaced image, coding is performed per a screen unit of two interlaced fields, or alternatively, per a screen unit of a frame that composites two interlaced fields.

Among three types of screen in MPEG-2, an I picture has all pixel values for a screen as information and is coded independently of other screens. A P picture is predictive-coded with an I picture or P picture that is temporally past as a reference frame (the difference between a P picture and a forward predicted value from an I or p picture is coded). A B picture is predictive-coded with an I picture and a P picture that are temporally previous and subsequent as reference frames (the differences between a B picture and predicted values in both directions from I, P pictures are coded).

In DCT coding, an input image is first divided into blocks of 8×8 pixels for each color component such as RGB and each of the blocks is DCT-transformed as 8×8 matrix data. This transform yields 8×8 DCT coefficients from each block. In MPEG-2, a macroblock (16×16 pixels) consisting of four blocks is the unit of coding.

Predictive coding performs motion compensated prediction that predicts motion vectors for each macroblock from a reference frame such as by matching. And the difference between the pixels of the reference frame and the pixels of a corresponding frame being predicted is coded.

A macroblock coded by DCT coding is called an intra-block and a macroblock coded by predictive coding is called a non-intra block. An I picture consists only of intra-blocks and a P picture and a B picture consist of intra-blocks and non-intra blocks.

After those codings, the coded data is quantized and coded such as by Huffman coding so that MPEG data is generated.

In the configuration above, the quantization/dequantization operation unit 10 performs dequantization to MPEG data to extract blocks of each screen (blocks of 8×8 pixels, which is subjected to DCT) that constitute motion picture data. The blocks are in fact DCT coefficients as described above. Also, the blocks of the screen obtained by processing motion picture are quantized to generate MPEG data.

The DCT/inverse DCT operation unit 20 performs DCT coding and predictive coding to uncompressed motion picture data to generate sets of blocks for each screen. Also, the quantization/dequantization operation unit 10 converts MPEG data, decodes extracted blocks, and generates pixel values of individual screens constituting the motion picture data. The motion picture will be reproduced based on the generated pixel values.

The watermark embedding/removal operation unit 30 embeds and removes a watermark in/from motion picture data. In this embodiment, to prevent data size to be handled from being enormous and also to protect an image from deterioration in decompressing and re-compressing motion picture data, a watermark is directly embedded in compressed motion picture data. Specifically, MEPG data is decoded (decoding of Huffman coded data), blocks are extracted by dequantization, and DCT coefficients are directly manipulated for the blocks so that watermark is embedded. This processing involves no deterioration of images because it can embed a watermark in MEPG data without performing inverse DCT and DCT that cause floating point errors.

As discussed above, the embodiment embeds a watermark by manipulating DCT coefficients for blocks extracted from MPEG data. Thus, a watermark pattern (image) is embedded in intra-blocks. For non-intra blocks, the difference between a non-intra block and a portion in which an intra-block has moved due to motion vectors that are defined for each macroblock is coded. This causes a problem that a watermark embedded in an intra-block moves in P and B pictures that contain non-intra blocks and the watermark is not at rest across the entire motion picture.

FIG. 3 illustrates an effect of motion vector in a block.

In the figure, if the upper left block (macroblock) of the reference block moves due to the motion vector shown, a portion of the watermark pattern embedded in the lower right block will be displayed in the upper left block in P and B blocks. Thus, in P and B pictures, it is necessary to add DCT coefficients for canceling the movement of the watermark pattern due to the motion vector and then embed the watermark pattern.

FIG. 4 shows the configuration of the watermark embedding/removal operation unit 30.

As shown, the watermark embedding/removal operation unit 30 comprises an intra-block processing unit 31 for embedding a watermark in intra-blocks, and a motion correction unit 32 for embedding a watermark in consideration of motion vectors for P and B pictures that contain non-intra blocks.

The intra-block processing unit 31 embeds and removes a watermark in/from intra-blocks in a similar manner to embedding and removing of a watermark for still picture data in JPEG and the like (see the technique disclosed by the Patent Document 1, for example).

That is, the intra-block processing unit 31 first generates a key necessary for both operations of embedding and removing a watermark. The key contains information on mark dot pattern, a start position for embedding visible data, mark size, mark depth, mark color, random pattern information (for complicating reversibility for an attacker without the key). The operations of embedding and removing watermark are all done based on the information contained in this key.

Embedding of a watermark pattern in intra-blocks is done by mapping a dot pattern obtained from the key on the original image. Because in this embodiment the watermark embedding/removal operation unit 30 embeds a watermark in MPEG data that is not inversely DCT-transformed, the intra-block processing unit 31 converts the dot pattern obtained from the key into DCT coefficients and adds them to intra-blocks. And when the watermark pattern is removed from intra-blocks in which the pattern is embedded, the image can be put back to a state identical to the original image through operations of DCT-transforming the dot pattern that can be obtained using the same key and subtracting it from the intra-blocks. The process thus is lossless.

Because a watermark pattern embedded in intra-blocks by the intra block processing unit 31 moves due to motion vectors for motion compensated prediction in P and B pictures, as a counteractive action, the motion correction unit 32 generates a cancellation pattern for eliminating the effect of motion vectors (the pattern of a watermark to be removed) and embeds it in blocks constituting the P and B pictures.

For generating a cancellation pattern, the embodiment proposes two methods: one that generates an image of a cancellation pattern based on motion vectors for each macroblock, subjects it to frequency transformation, and embeds it in the dot pattern of the original pattern (hereinafter "Method 1"); and one that limits required cancellation patterns by setting conditions on watermark patterns, prepares pattern tables for cancellation patterns in advance, and embeds an appropriate cancellation pattern in the dot pattern of the original image (hereinafter "Method 2"). These methods will be described in detail in the following.

<Method 1>

Generation of a cancellation pattern needs consideration matters as follows:

- For each macroblock, there are motion vectors for forward and inverse predictions (see FIG. 5) and further motion vectors for odd lines and even lines for interlaced images, thus, at most four types of motion vectors can be defined (for MPEG-2).
- The operation of canceling a watermark need to be performed to DCT coefficients, thus, DCT that contains floating point operation need to be dynamically performed for a pattern generated for each block (8×8 pixels).
- To remove the watermark, these operations need to be done within a predetermined time period (30 images/second normally).
- Motion vectors can be defined for between pixels (half-pel) and interpolation for handling them is required. FIG. 6 shows patterns of interpolation for half-pel. In the figure, positions 1, 2, 4, and 5 are interpolations for two pixels, above and below or left and right, and position 3 is interpolation for four pixels.

With those matters in mind, the operation of generating a cancellation pattern and embedding it as a watermark pattern in each block of P and B pictures will be now described.

FIG. 7 is a flowchart showing the procedure of embedding a watermark when a cancellation pattern is generated with Method 1.

As initialization, a table is prepared in advance that indicates a watermark image for the entire screen for use in determining the presence of the watermark in each block of the screen.

As shown in FIG. 7, the motion correction unit 32 first determines if the watermark is present at a position to which the block has moved due to motion vectors (step 701). If watermark is not present at the position, embedding of a watermark is not performed.

If the watermark is present at the position to which the block has moved, the motion correction unit 32 generates an image of the watermark (cancellation pattern) that has moved due to the motion vector in consideration of half-pel (step 702). The generated image is preserved in the work area of the main memory 103 shown in FIG. 1, for example. Then, the motion correction unit 32 composites generated watermark images for all motion vectors (step 703). The composited image is preserved in the work area of the main memory 103 shown in FIG. 1, for example. The motion correction unit 32 then performs DCT to the composited image and generates a cancellation pattern (DCT coefficients) in frequency domain (step 704). The generated cancellation pattern is preserved in the work area of the main memory 103 shown in FIG. 1, for example. Subsequently, based on the generated cancellation pattern, the motion correction unit 32 removes the watermark pattern to be canceled that has moved due to motion vectors (step 705), and embeds a watermark pattern the same as the watermark pattern that is embedded in intra-blocks (step 706).

The operation is performed for all blocks of P or B pictures being processed, and when a required cancellation pattern and a watermark pattern have been embedded, the processing is terminated (step 707).

<Method 2>

In Method 1, an image of a cancellation pattern is generated, subjected to DCT, and embedded in blocks of the original image. Because this method requires DCT to a cancellation pattern when embedding a watermark, it places a burden on hardware correspondingly. Method 2 thus omits DCT in embedding a watermark so as to reduce burden on hardware.

First, Method 2 imposes a condition on watermark patterns to be embedded in motion picture data. This embodiment sets a condition that one dot of a watermark pattern is displayed by one macroblock (16×16 pixels). With the condition, a watermark pattern appearing in one macroblock will be a rectangle or a plurality of rectangles that have very limited shapes. This enables all cancellation patterns for cancelling motion vectors to be generated using four types of basic pattern and combination of them.

FIG. 8 shows basic patterns of cancellation pattern generated in Method 2; FIG. 9 shows pattern tables generated for the basic patterns; and FIG. 10 shows combined patterns that are obtained using the basic patterns in FIG. 8.

Displaying one dot of a watermark pattern with one macroblock, the basic pattern is expressed as one rectangle that appears in any of upper left, upper right, lower left, and lower right of a block (hereinafter referred to as basic patterns 1, 2, 3, and 4, respectively) as shown in FIG. 8. A rectangle that appears on the upper side, lower side, left side, or right side of a macroblock, or that covers an entire macroblock can be considered as a special form of basic pattern (for example, the basic block 1 that is a rectangle appearing in upper left of a macroblock).

Using the basic pattern 1 as an example, the pattern table will be described.

The basic pattern 1 appears in 64 sizes for an 8×8 pixel block. Thus, 64 types of pattern tables are prepared as shown in FIG. 9 so as to accommodate the basic pattern 1 of all possible sizes. For each of basic patterns 2, 3, and 4, 64 types of pattern tables are similarly prepared. In addition, patterns tables for non-interlaced screen and interlaced screen are also required, thus, 512 (=64×4×2) types of pattern tables are prepared in total. If a cancellation pattern expands across one side of a block or covers an entire block in the basic patterns 1, 2, 3, and 4, some of the pattern tables generated for the basic patterns overlap each other. Such overlapping pattern tables may be omitted to reduce the number of pattern tables.

All the pattern tables should be generated and subjected to DCT prior to embedding of a watermark. Thus, in embedding a watermark, necessary DCT coefficients can be obtained just by specifying a cancellation pattern that cancels motion vectors and referencing a corresponding pattern table. That is, DCT need not to be performed when a watermark is embedded.

FIG. 10(A) shows combined patterns that can be obtained by adding the basic pattern 1 to basic pattern 4 and basic pattern 2 to basic pattern 3; and FIG. 10(B) shows combined patterns that can be obtained by subtracting the basic patterns 1, 2, 3, and 4 from a watermark pattern that covers an entire block, respectively.

If a condition that one dot of a watermark pattern is displayed by one macroblock is set, a watermark pattern that appears in a block will be included by any of these basic patterns and the combined patterns. Thus, all cancellation patterns that can appear in blocks can be expressed by combining the basic patterns 1, 2, 3, and 4 as described above.

FIG. 11 is a flowchart showing the procedure of embedding a watermark when a cancellation pattern is generated in Method 2.

As initialization, a table is prepared in advance that shows a watermark image for an entire screen for use in determining the presence of the watermark in each block of the screen. Also, DCT is performed in advance to (512) pattern tables for all the basic patterns to obtain DCT coefficients. The pattern tables are preserved in the work area of the main memory 103 in FIG. 1, for example.

As shown in FIG. 11, the motion correction unit 32 first determines if the watermark is present at a position to which a block has moved due to motion vectors (step 1101). If the watermark is not present at the position, embedding of the watermark is not performed.

In contrast, if the watermark is present at the position to which the block has moved, the motion correction unit 32 determines the basic pattern to be used as a cancellation pattern and obtains information on the size of the watermark by scanning in vertical and horizontal directions (step 1102). Based on the type and the vertical and horizontal sizes of the obtained basic pattern, the motion correction unit 32 selects an appropriate pattern table for the basic pattern from the group of pattern tables prepared in advance (step 1103). The motion correction unit 32 then determines a necessary combined pattern, performs calculation using the pattern table for the basic pattern selected at step 1103 (addition or subtraction of the basic pattern) to generate a pattern table for the combined pattern (step 1104). The generated pattern table is preserved in the work area of the main memory 103 shown in FIG. 1, for example. The motion correction unit 32 then generates pattern tables for all motion vectors (performing interpolation as required for half-pel) and, based on them, computes a pattern table (luminance values and quantization coefficients) for the cancellation pattern (step 1105). The result of the computation is preserved in the work area of the main memory 103 of FIG. 1, for example. Subsequently, based on the pattern table as the computation result, the motion correction unit 32 removes the watermark pattern to be canceled that has moved due to motion vectors (step 1106) and embeds a watermark pattern the same as the watermark pattern that has been embedded in intra-blocks (step 1107).

The operations are performed for all blocks in P or B pictures to be processed, and when a necessary cancellation pattern and a watermark pattern have been embedded, the processing is terminated (step 1108).

As described in Methods 1 and 2, the embodiment not only embeds a watermark pattern in intra-block by the intra block processing unit 31 but generates a cancellation pattern for canceling effect of motion vectors by the motion correction unit 32 and embeds it as a watermark pattern in blocks that require it. This can prevent a watermark pattern from moving due to motion compensated prediction for P and B pictures.

In the description following, the flow of embedding/removing a watermark in/from video content by the motion picture data processing device configured as described above will be described.

FIG. 12 shows the flow of embedding/removing a watermark in/from video content in MPEG-2.

As shown in the figure, when the motion picture data input/output unit 40 of the motion picture data processing device inputs a program stream in MPEG-2 of the video contents to be processed, the sequence layer is obtained from the video packet and further the GOP (Group Of Picture) layer is obtained. And the quantization/dequantization operation unit 10 performs decoding of variable-length codes (Huffman decoding) in respect to each screen (picture) of the GOP, extracts blocks constituting the screen, and performs dequantization.

Those operations yield a set of data (DCT coefficients) for each screen that are frequency-converted through DCT. And for the set of data, the watermark embedding/removal operation unit 30 embeds or removes a watermark. Specifically, in the case of watermark embedding, the DCT coefficients of a watermark pattern (including a cancellation pattern) generated by the intra block processing unit 31 and motion correction unit 32 are added to the set of data for corresponding blocks. In the case of watermark removal, reversely, the DCT coefficients of the watermark pattern are subtracted from the set of data for the blocks.

Then, the quantization/dequantization operation unit 10 again performs quantization to the screen with the watermark embedded or removed in/from appropriate blocks, the blocks are scanned, and variable-length coding (Huffman coding) is performed. And GOP layer is generated based on the coded screen data and a program stream in MPEG-2 is generated via sequence layer. The generated program stream in MPEG-2 is output by the motion picture data input/output unit 40.

As mentioned above, in the process of embedding/removing a watermark in/from MPEG data, as far as dequantization is performed to the MPEG data, however, inverse DCT and DCT by the DCT/inverse DCT operation unit 20 are not performed. By not performing DCT involving floating point errors, watermark embedding of the embodiment has reversibility and can eliminate a watermark completely without degrading images.

The description above has been for a case where watermark data that is frequency-converted by DCT is embedded/removed in/from blocks with MPEG data dequantized. However, the embodiment is applicable to embedding or removal of watermark data in/from blocks constituting each screen without dequantization of each screen in the GOP layer of MPEG data.

FIG. 13 shows a functional configuration of the motion picture data processing device for that case.

The watermark embedding/removal operation unit 30 shown in FIG. 13 embeds or removes a watermark in/from MPEG data inputted by the motion picture data input/output unit 40 at a stage prior to processing by the quantization/dequantization operation unit 10, rather than embedding or removing a watermark in/from MPEG data that has been dequantized by the quantization/dequantization operation unit 10 as shown in FIG. 2. The intra-block processing unit 31 and the motion correction unit 32 constituting the watermark embedding/removal operation unit 30 not only frequency-converts an image of a watermark to be embedded in blocks (or its pattern tables) but further quantizes the image and adds (or subtracts) it to/from the data set for each block. In this case, the operation of embedding or removing a watermark can be also done without going through quantization and DCT to MPEG data, which are lossy processing. Thus, it is possible to embed and remove a watermark without degrading images.

An example of application of the motion picture data processing device of the invention will be described.

FIG. 14 shows an example of the configuration of a video content distribution system to which watermark embedding/removal of the embodiment is applied.

In the figure, a server 1410 distributes video content to user terminals 1420 over the Internet 1401. The server 1410 has an application server 1411 and a video server 1412. The video server 1412 and the user terminals 1420 function as the motion picture data processing devices according to the embodiment. That is, the video server 1412 embeds a watermark pattern in video contents to be distributed. For embedding the watermark pattern, a predetermined key is used that contains information on mark dot patterns for identifying the watermark pattern. The user terminal 1420 accesses the application server 1411 of the server 1410, is authenticated, and obtains a key necessary for removing the watermark. And the user terminal 1420 receives the video contents distributed by the video server 1412, removes the watermark pattern from the video contents using the key, and reproduces the video contents.

A user terminal 1420 that did not pass the authentication at the application server 1411 cannot remove the watermark pattern from the video contents, thus, cannot view the original motion picture even if it reproduces the video contents.

Because image does not deteriorate in embedding/removing a watermark in this embodiment, such an operation is possible that instead embeds an invisible watermark containing information identifying a user terminal 1420 in video contents when a visible watermark is removed from the video content at the user terminal 1420. This manipulation allows the source to be easily identified when the video content circulates on the network separately from authentic distribution by the server 1410.

Advantages of the Invention

As has been described, according to the invention, it is possible to embed and remove a visible watermark in/from compressed motion picture data.

In addition, complete reversibility can be realized in embedding and removing a visible watermark in/from compressed motion picture data in accordance with the invention.

BRIEF DESCRIPTION OF THE DRAWINGS

FIG. 1 schematically shows an example of the hardware configuration of a computer that can implement embedding and removal of digital watermarks according to an embodiment;

FIG. 2 shows a functional configuration of a motion picture data processing device that implements embedding and removal of watermarks according to the embodiment;

FIG. 3 illustrates an affect of motion vector in a block;

FIG. 4 shows the configuration of a watermark embedding/removal operation unit of the embodiment;

FIG. 5 illustrates the types of motion vectors;

FIG. 6 illustrates interpolation patterns for half-pel;

FIG. 7 is a flowchart showing the procedure of embedding a watermark in the case a cancellation pattern is generated by Method 1 of the embodiment;

FIG. 8 shows basic patterns of cancellation pattern generated in Method 2 of the embodiment;

FIG. 9 shows pattern tables that are generated for the basic patterns of FIG. 8;

FIG. 10 shows combined patterns that are obtained using the basic patterns of FIG. 8;

FIG. 11 is a flowchart illustrating the procedure of embedding a watermark in the case a cancellation pattern is generated in Method 2 of the embodiment;

FIG. 12 shows the flow of embedding/removing a watermark in/from video contents in MPEG-2 in accordance with the embodiment;

FIG. 13 shows another functional configuration of the motion picture data processing device;

FIG. 14 shows an example of the configuration of a video content distribution system to which the embedding/removal of watermark according to the embodiment is applied; and FIG. 15 illustrates a screen showing an image as content and a screen showing the image as well as a visible watermark that covers some portions of the image.

DESCRIPTION OF SYMBOLS

10 . . . Quantization/dequantization operation unit
20 . . . DCT/inverse DCT operation unit
30 . . . Watermark embedding/removal operation unit
31 . . . Intra-block processing unit
32 . . . Motion correction unit
101 . . . CPU
103 . . . Main memory
105 . . . Hard disk
106 . . . Network interface

The invention claimed is:

1. A motion picture data processing device, comprising:
inputting means for inputting motion picture data that has been subjected to compression including frequency transformation and quantization;
watermark embedding means for generating and embedding a digital watermark pattern of a visible watermark corresponding to a motion compensated prediction in said motion picture data input by said inputting means, wherein said watermark embedding means comprises (i) intra-block processing means for embedding said digital watermark pattern into blocks that have pixel values relevant to all pixels as information among screens constituting said motion picture data, and (ii) motion correction means for embedding a cancellation pattern for canceling the movement of said digital watermark pattern due to motion vectors in a screen that is generated through motion compensated prediction based on motion vectors among screens constituting said motion picture data, wherein said motion correction means removes the embedded digital watermark pattern, generates an image of said cancellation pattern, subjects the image of said cancellation pattern to frequency transformation, and embeds the frequency transformed image in a screen being processed; and
outputting means for outputting motion picture data with the watermark embedded therein by said watermark embedding means.

2. A motion picture data processing device, comprising:
inputting means for inputting motion picture data that has been subjected to compression including frequency transformation and quantization;
watermark embedding means for generating and embedding a digital watermark pattern of a visible watermark corresponding to a motion compensated prediction in said motion picture data input by said inputting means, wherein said watermark embedding means comprises (i) intra-block processing means for embedding said digital watermark pattern into blocks that have pixel values relevant to all pixels as information among screens constituting said motion picture data, and (ii) motion correction means for embedding a cancellation pattern for canceling the movement of said digital watermark pattern due to motion vectors in a screen that is generated through motion compensated prediction based on motion vectors among screens constituting said motion picture data, wherein said motion correction means prepares in advance pattern tables for possible cancellation patterns that have been frequency-converted, and selects a given pattern table from the pattern tables and embeds the given pattern table in a screen being processed; and
outputting means for outputting motion picture data with the watermark embedded therein by said watermark embedding means.

3. A motion picture data processing device, comprising:
dequantization means for dequantizing motion picture data that has been subjected to compression including discrete cosine transform (DCT) and quantization;
watermark embedding means for embedding a digital watermark pattern of a watermark converted into a DCT coefficient in said motion picture data dequantized by said dequantization means, wherein said watermark embedding means comprises (i) intra-block processing means for converting the image of said digital watermark pattern to DCT coefficients and embedding the DCT coefficients into screens that have pixel values relevant to all pixels as information among screens constituting said motion picture data, and (ii) motion correction means for embedding a cancellation pattern for canceling the movement of said digital watermark pattern due to motion vectors in a screen that is generated through motion compensated prediction based on motion vectors among screens constituting said motion picture data, wherein said motion correction means removes the embedded digital watermark pattern, generates an image of said cancellation pattern based on said motion vectors, converts the image into DCT coefficients, and embeds the DCT coefficients into a screen being processed; and quantization means for quantizing motion picture data with the watermark embedded therein by said watermark embedding means.

4. A motion picture data processing device, comprising:

dequantization means for dequantizing motion picture data that has been subjected to compression including discrete cosine transform (DCT) and quantization;

watermark embedding means for embedding a pattern of a watermark converted into a DCT coefficient in said motion picture data dequantized by said dequantization means, wherein said watermark embedding means comprises (i) intra-block processing means for converting the image of said digital watermark pattern to DCT coefficients and embedding them into screens that have pixel values relevant to all pixels as information among screens constituting said motion picture data, and (ii) motion correction means for embedding a said digital watermark pattern for which the effect of motion vectors are canceled in a screen that is generated through motion compensated prediction based on motion vectors among screens constituting said motion picture data, wherein said motion correction means prepares in advance pattern tables that show DCT coefficients produced by converting images of possible said digital watermark patterns, and selects a given pattern table from the pattern tables and embeds the given pattern table in a screen being processed; and quantization means for quantizing motion picture data with the watermark embedded therein by said watermark embedding means.

5. A motion picture processing method for embedding a watermark in motion picture data that has been subjected to compression including frequency transformation and quantization by using a computer, comprising:

a first step of inputting motion picture data that has been subjected to said compression and storing the data in predetermined storing means;

a second step of embedding a digital watermark pattern of a visible watermark corresponding to a motion compensated prediction in said motion picture data stored in said predetermined storing means and storing the data in said predetermined storing means by use of watermark embedding means, wherein said second step comprises the steps of (i) generating an image of a cancellation pattern for canceling the movement of said digital watermark pattern due to motion vectors for a screen that is generated through motion compensated prediction based on motion vectors among screens constituting said motion picture data and storing the image in said predetermined storage means, (ii) removing the embedded digital watermark pattern, and (iii) subjecting said image stored in said predetermined storage means to frequency transformation and embedding the frequency transformed image in a screen being processed; and a third step of outputting said motion picture data with the watermark embedded therein and stored in said predetermined storage means.

6. A motion picture processing method for embedding a watermark in motion picture data that has been subjected to compression including frequency transformation and quantization by using a computer, comprising:

a first step of inputting motion picture data that has been subjected to said compression and storing the data in predetermined storing means;

a second step of embedding a digital watermark pattern of a visible watermark corresponding to a motion compensated prediction in said motion picture data stored in said predetermined storing means and storing the data in said predetermined storing means by use of watermark embedding means, wherein said second step comprises the steps of: (i) determining whether it is necessary to embed a cancellation pattern for canceling the movement of said digital watermark pattern due to motion vectors in a screen that is generated through motion compensated prediction that is based on motion vectors among screens constituting said motion picture data on the basis of motion vectors for that screen; and (ii) if it is determined that it is necessary to embed said cancellation pattern, selecting a given pattern table from a group of pattern tables that store frequency-converted values of possible cancellation patterns as stored in predetermined storing means and embedding the given pattern table into a screen being processed; and a third step of outputting said motion picture data with the watermark embedded therein and stored in said predetermined storage means.

7. A computer program stored on a computer readable medium, for embedding a watermark in motion picture data that has been subjected to compression including frequency transformation and quantization by controlling a computer, wherein said program product causes said computer to perform:

a first process for inputting motion picture data that has been subjected to said compression and storing the data in predetermined storing means;

a second process for embedding a digital watermark pattern of a visible watermark corresponding to a motion compensated prediction in said motion picture data stored in said predetermined storing means and storing the data in said predetermined storing means, wherein said second process comprises the processes of embedding said digital watermark pattern into screens that have pixel values relevant to all pixels as information among screens constituting said motion picture data, and embedding a cancellation pattern for canceling the movement of said digital watermark pattern due to motion vectors into a screen that is generated through motion compensated prediction based on motion vectors among screens constituting said motion picture data, wherein said process of embedding a cancellation pattern comprises the processes of: (i) generating an image of a cancellation pattern for canceling the movement of said digital watermark pattern due to motion vectors for a screen that is generated through motion compensated prediction based on motion vectors among screen constituting said motion picture data and storing it in said predetermined storage means; (ii) removing the embedded digital watermark pattern and (iii) subjecting said image stored in said predetermined storage means to frequency transformation and embedding the frequency transformed image in a screen being processed; and a third process for quantizing said motion picture data with the watermark embedded therein and stored in said predetermined storing means.

8. A computer program stored on a computer readable medium, for embedding a watermark in motion picture data that has been subjected to compression including frequency transformation and quantization by controlling a computer, wherein said program product causes said computer to perform:

a first process for inputting motion picture data that has been subjected to said compression and storing the data in predetermined storing means;

a second process for embedding a digital watermark pattern of a visible watermark corresponding to a motion compensated prediction in said motion picture data stored in said predetermined storing means and storing the data in said predetermined storing means, wherein said second process comprises the processes of embedding said digital watermark pattern into screens that have pixel values relevant to all pixels as information among screens constituting said motion picture data, and embedding a cancellation pattern for canceling the movement of said digital watermark pattern due to motion vectors into a screen that is generated through motion compensated prediction based on motion vectors among screens constituting said motion picture data, wherein said process of embedding a cancellation pattern comprises the processes of: (i) determining whether it is necessary to embed a cancellation pattern for canceling the movement of said digital watermark pattern due to motion vectors into a screen that is generated through motion compensated prediction that is based on motion vectors among screens constituting said motion picture data on the basis of motion vectors for that screen; and (ii) if it is determined that it is necessary to embed said cancellation pattern, selecting a given pattern table from a group of pattern tables that store frequency-converted values of possible cancellation patterns as stored in said predetermined storing means and embedding the given pattern table into a screen being processed; and a third process for quantizing said motion picture data with the watermark embedded therein and stored in said predetermined storing means.

* * * * *